(12) United States Patent
Holmdahl

(10) Patent No.: US 9,251,622 B2
(45) Date of Patent: Feb. 2, 2016

(54) SYSTEM AND METHOD FOR CALCULATING MULTI-RESOLUTION DYNAMIC AMBIENT OCCLUSION

(71) Applicant: Take Two Interactive Software, Inc., New York, NY (US)

(72) Inventor: Henrik Carl Holmdahl, San Francisco, CA (US)

(73) Assignee: TAKE TWO INTERACTIVE SOFTWARE, INC., New York, NY (US)

( * ) Notice: Subject to any disclaimer, the term of this patent is extended or adjusted under 35 U.S.C. 154(b) by 0 days.

(21) Appl. No.: 14/502,885

(22) Filed: Sep. 30, 2014

(65) Prior Publication Data

US 2015/0084958 A1    Mar. 26, 2015

Related U.S. Application Data

(63) Continuation of application No. 13/782,555, filed on Mar. 1, 2013, now Pat. No. 8,847,958, which is a continuation of application No. 11/942,702, filed on Nov. 19, 2007, now Pat. No. 8,390,621.

(60) Provisional application No. 60/886,387, filed on Jan. 24, 2007.

(51) Int. Cl.
*G06T 15/80* (2011.01)
*G06T 15/50* (2011.01)
*G06T 17/10* (2006.01)

(52) U.S. Cl.
CPC ............... *G06T 15/80* (2013.01); *G06T 15/506* (2013.01); *G06T 17/10* (2013.01); *G06T 2219/2012* (2013.01)

(58) Field of Classification Search
None
See application file for complete search history.

(56) References Cited

U.S. PATENT DOCUMENTS

| | | | | |
|---|---|---|---|---|
| 5,886,702 | A * | 3/1999 | Migdal et al. | 345/423 |
| 2007/0013696 | A1* | 1/2007 | Desgranges et al. | 345/426 |
| 2007/0018980 | A1* | 1/2007 | Berteig et al. | 345/426 |

* cited by examiner

*Primary Examiner* — Said Broome
(74) *Attorney, Agent, or Firm* — Kenyon & Kenyon LLP

(57) ABSTRACT

A system and method for generating a three-dimensional image is provided. An embodiment of the present invention includes calculating the ambient occlusion at a vertex in multiple, independent stages. Determining the global AO at the vertex may be performed using a first technique. Determining the local AO at the vertex may be performed using a second technique. The total AO can be found as a function of the local AO and global AO.

20 Claims, 9 Drawing Sheets

Local AO

Global AO

Total AO

SYSTEM AND METHOD FOR CALCULATING MULTI-RESOLUTION DYNAMIC AMBIENT OCCLUSION

CROSS REFERENCE TO RELATED APPLICATION

The present application claims the benefit of co-pending U.S. provisional application Ser. No. 60/886,387 filed on Nov. 17, 2006. The disclosure of the co-pending provisional application is incorporated herein by reference in its entirety.

FIELD OF THE INVENTION

The present disclosure relates generally to three-dimensional computer graphics and, more particularly, to a method for facilitating multi-resolution dynamic ambient occlusion in real-time video applications.

BACKGROUND

Computer-generated, three-dimensional images are now commonly seen in movies, television shows, video games, and various other video applications. Different shading techniques, of varying complexity, are frequently used to add realism to the generated images and to make details more visible. An example of a simple shading technique might be to calculate the effects caused by a single point source of light on an image without taking into consideration factors such as reflection and diffusion. A more complicated shading technique might be full global illumination which takes into consideration all direct and indirect light sources as well as the reflection and diffusion caused by those sources. Ambient Occlusion (AO) is a shading technique that approximates full global illumination by taking into account the attenuation of light due to occlusion in order to improve local reflection models. Unlike other local shading methods, AO determines the illumination at each point as a function of other geometry in the scene.

More complicated shading techniques typically require more calculations, and thus take longer to perform and require more processing resources because the amount of data used to determine the shading is far greater. Performing these calculations tends to not be a limiting factor for movies or television because those images do not need to be generated in real time. In applications such as video games, however, images need to be generated in real time. Therefore, the amount of time allowed and processor resources available for generating images are limited by hardware capabilities.

Accordingly, there exists in the art a need to perform shading techniques such as ambient occlusion as rapidly as possible so that they can be incorporated into systems generating real-time images.

DETAILED DESCRIPTION

Embodiments of the present invention include calculating the ambient occlusion experienced by an object in multiple, independent stages. For example, a first stage might involve calculating the AO contribution of nearby, or local, geometry for each vertex of a dynamic model and a second stage might involve calculating the AO contribution of distant, or global, geometry for each vertex. The AO contributions calculated in each, independent stage can be merged according to the laws of probability in order to find the total AO effect experienced by an object.

It has been observed that the AO contribution of distant geometry can be well approximated by the AO contribution of simple geometric primitives, such as sets of spheres. The AO contribution of nearby geometry on the other hand requires more accurate calculations and needs to take the exact underlying geometry into account. Thus, an aspect of the present invention includes calculating the AO effects experienced by a vertex in multiple, independent stages. For example, a first stage might calculate the AO contribution of nearby, or local, geometry and a second stage might calculate the AO contribution of distant, or global, geometry. Because AO can be thought of as the probability of occlusion of ambient light, the AO contributions calculated in each, independent stage can be merged according to the laws of probability in order to find the total AO effect experienced by a vertex. By determining the AO at a series of vertices, a system can generate more realistic and more detailed objects, which result in higher quality images.

Figure 1:
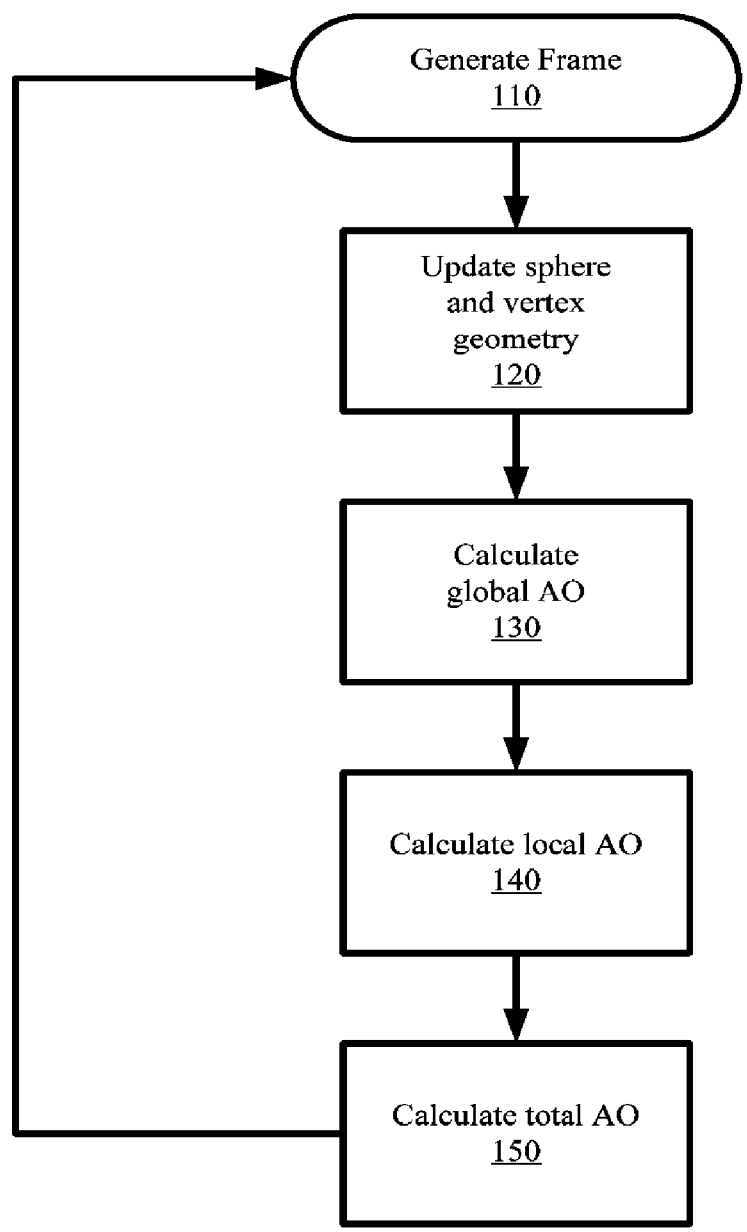
FIG. 1 shows a flow chart illustrating an exemplary method according to an embodiment of the present invention.

FIG. 1 shows a flow chart illustrating an example method according to an embodiment of the present invention. In this embodiment, the method begins when a new frame is generated (block 110). The frame contains one or more three-dimensional objects that can be approximated by using geometric primitives such as spheres and modeled on what are called meshes. Meshes can be created from series of interconnected triangles. In response to an event, the sphere and vertex geometry of the image may need to be updated (block 120). In a video game, an example of an event causing the sphere and vertex geometry of the image to be updated may be a user commanding an object, such as a person or an automobile, to move relative to other objects in the image.

After the sphere and vertex geometry has been updated, the AO experienced by the object needs to be calculated. An aspect of the present invention includes calculating the total AO in multiple, independent stages. For example, the AO contributed by distant objects is calculated first (block 130). Then, the AO contributed by the near objects are calculated (block 140). Once both have been calculated, the total AO can be calculated (block 150). Once the total AO has been calculated, a new frame including the total AO shading can be generated (block 110), and the process can repeat itself It will be readily apparent to one skilled in the art that the order in which the global and local AO are determined can be altered without the use of inventive faculty. The local and global AO may also be determined simultaneously.

In a video game system which needs to generate images in real-time, the calculations needed to generate an image, including the calculations to determine the total AO, must be performed rapidly.

An embodiment of the present invention involves approximating a model with a set of spheres in addition to the triangulated geometry. A further embodiment of the present invention includes using a first technique for calculating the contributions of the local AO (block 140), and a second, faster technique for calculating the contributions of the global AO (block 130). The global AO component typically varies smoothly across a model surface, while the local AO component often changes quite abruptly. Thus, for each unique vertex in an object, the global AO component may be approximated using the spheres and the local AO component can be calculated using the triangulated geometry.

The determination of whether to use the local technique or the global technique for determining the AO experienced at a vertex by an object can be determined either statically by a computer programmer writing the graphics generating code or may be determined dynamically by various algorithms available in the art.

A further embodiment of the present invention involves pruning redundant vertices so that calculations are performed only for unique vertices. For example, when the sphere and vertex geometry is updated (block 120), the system determines for which vertices the AO needs to be determined. Uniqueness can be determined, for example, by vertex position by assuming a smooth model surface.

In another embodiment of the present invention, the AO calculations used to determine the global AO and local AO may be performed in screen space (i.e., per pixel) and/or in object space (i.e., per vertex). In an example embodiment of the AO calculations in the algorithm of the present invention are performed per pixel with the calculations being done on the GPU, instead of, for example, a CPU.

Figure 2A:
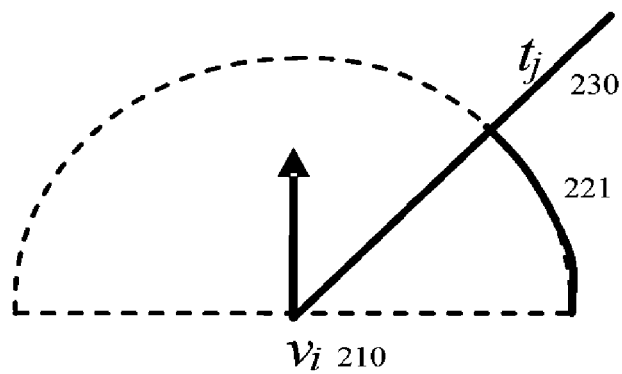
FIG. 2A shows a vertex that experiences AO from a near object.
Figure 2B:
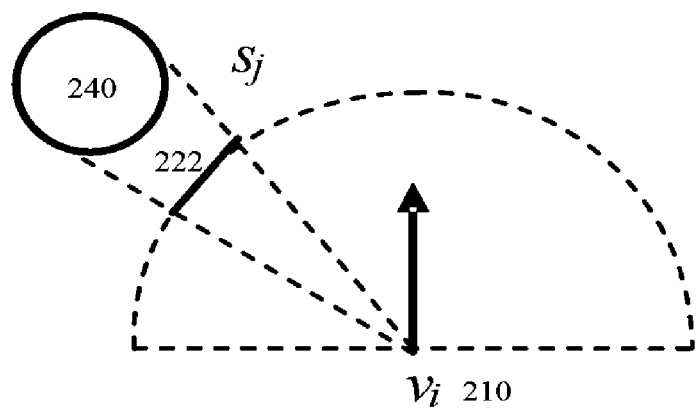
FIG. 2B shows a vertex that experiences AO from a distant object.
Figure 2C:
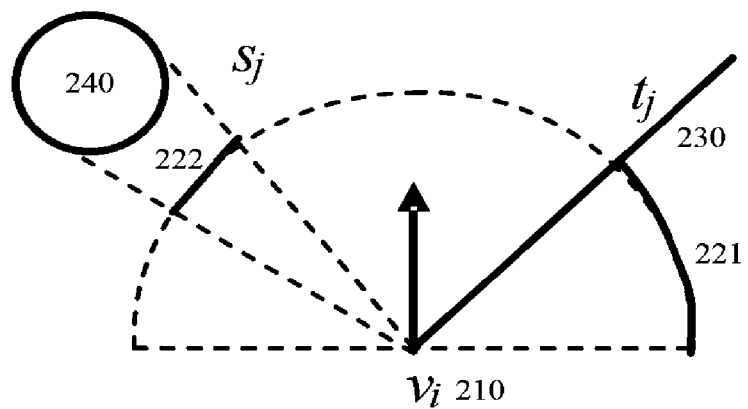
FIG. 2C shows a vertex that experiences AO from both a near object and a distant object.

FIGS. 2A, 2B, and 2C show a vertex ($v_i$) 210 that experiences AO 221, 222 from both a near object ($t_j$) 230 and a distant object ($S_j$) 240. The total AO 221, 222 experienced by the vertex ($v_i$) 210 will be a function of both the local AO 221 and the global AO 222.

Figure 3A:
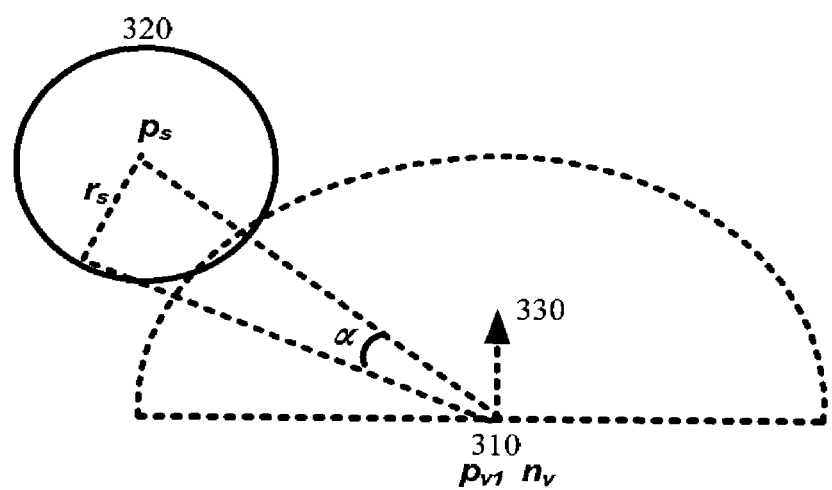
FIG. 3A shows an example of how the spheres of a distant object can be used to calculate the global AO experienced by a vertex.
Figure 3B:
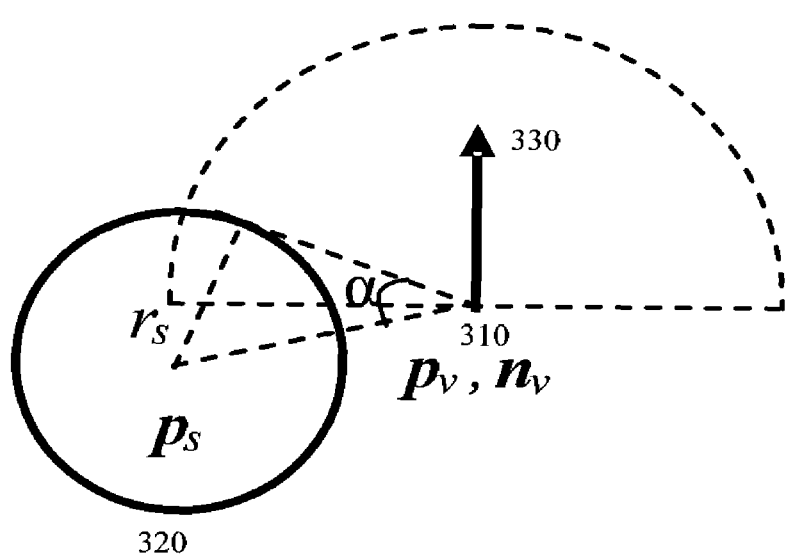
FIG. 3B shows an example of how the spheres of a distant object can be used to calculate the global AO experienced by a vertex.

FIGS. 3A and 3B show an example embodiment involving use of spheres 320 to approximate a distant object can be used to calculate the global AO contribution of the total AO experienced by a vertex ($v_i$) 310. A sphere 320 with center position $p_s$ and radius $r_s$ will occlude a vertex $v_i$ 310 with position $p_v$ and normal $n_v$ 330 if it is, at least partially, above $v_i$'s tangent plane. The AO is a function of the angle a of the spherical cap that is defined by $p_v$ and the tangents of the sphere that go through $p_v$. The normalized cosine-weighted solid angle of a spherical cap with angle $\alpha$ is $\sin^2 \alpha$.

FIG. 3A illustrates a first case where the sphere 320 is fully visible. The AO can be calculated as follows:

$$v = p_s - p_v$$

$$\sin^2 \alpha = \frac{r_s^2}{v^T \cdot v}$$

$$\cos \beta = \frac{v^T}{\|v\|} \cdot n_v$$

$$AO = 1 - \sin^2 \alpha \cos \beta$$

FIG. 3B illustrates a second case, where the sphere 320 is clipped by the tangent plane. The AO can be approximated as follows:

$$v = p_s - p_v$$

$$\sin^2 \alpha = \frac{r_s^2}{v^T \cdot v}$$

$$\cos \beta = \frac{v^T}{\|v\|} \cdot n_v$$

$$\cos \beta' = \frac{\cos \beta + \sin \alpha}{2}$$

$$AO = 1 - \sin^2 \alpha \cos \beta'$$

Figure 4A:
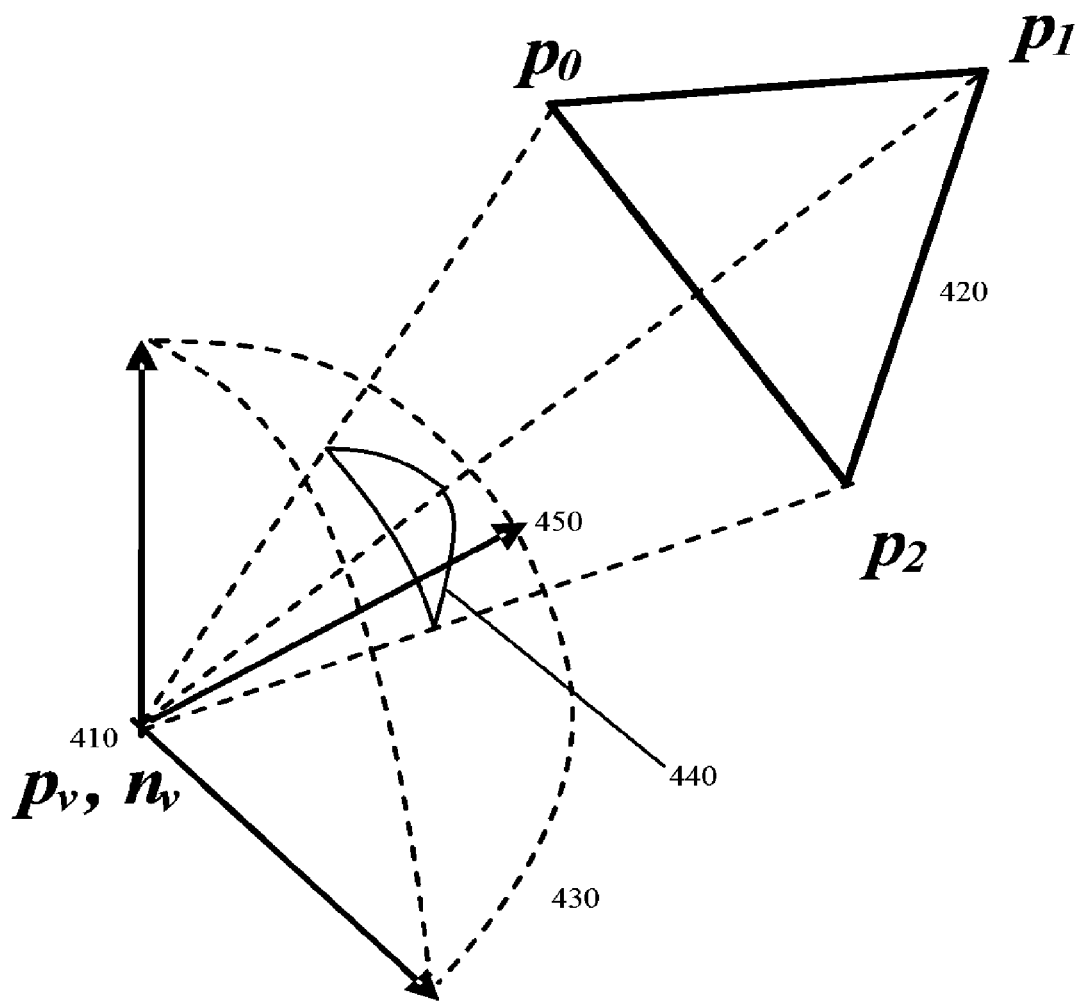
FIG. 4A shows an example of how triangles can be used to calculate the local AO experienced by a vertex.
Figure 4B:
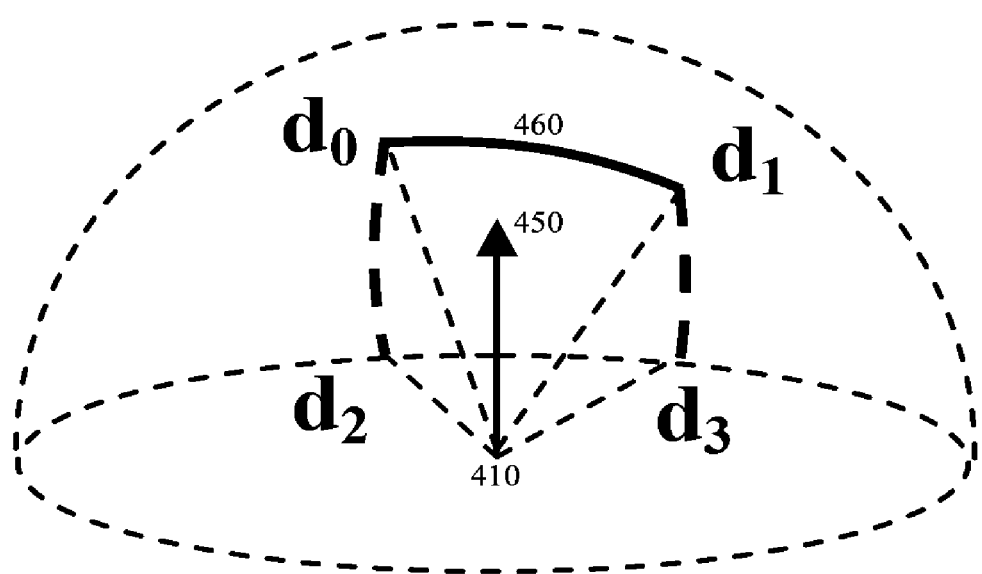
FIG. 4B shows an example of how triangles can be used to calculate the local AO experienced by a vertex.
Figure 4C:
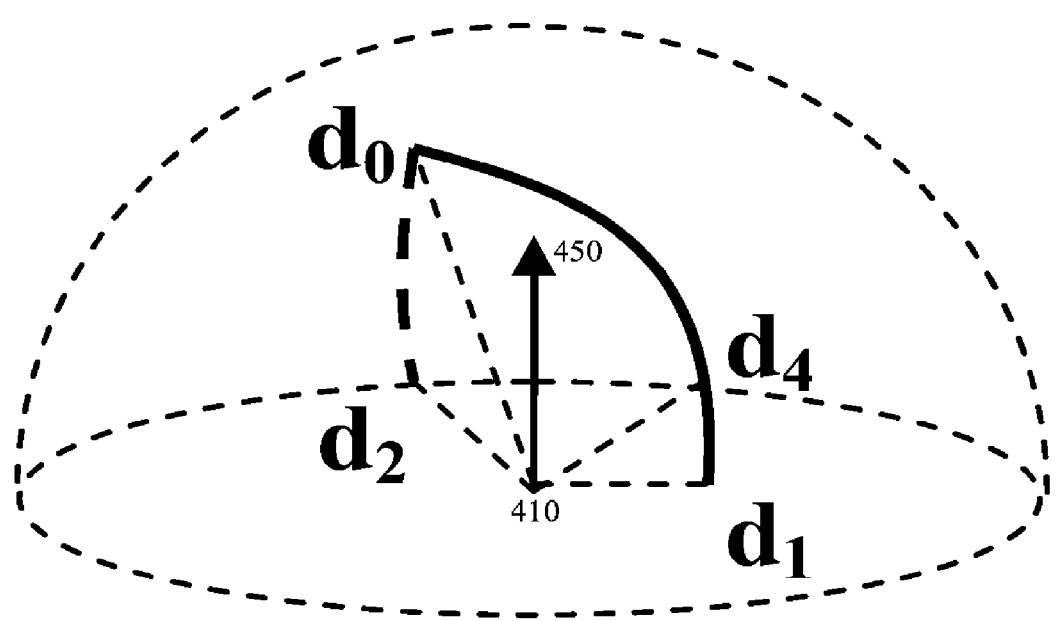
FIG. 4C shows an example of how triangles can be used to calculate the local AO experienced by a vertex.

FIGS. 4A, 4B, and 4C show example embodiments involving the use of triangles to calculate the local AO contribution of the total AO experienced by a vertex ($v_i$) 410. To calculate the local AO of a vertex $v_i$ 410 with position $p_v$ and normal $n_v$ 450, two types of local triangles may be considered because a vertex ($v_i$) 410 can either be part of a triangle or not. FIG. 4A shows an example of a triangle that does not include vertex $v_i$. A triangle 420 with vertex positions $p_0$, $p_1$, $p_2$ (i.e., it does not include $p_v$) will occlude $v_i$ 410 if it is, at least partially, above $v_i$'s tangent plane and front-facing with respect to $v_i$ 410. The calculations can be done by first projecting the triangle 420 vertices onto the unit sphere 430 centered at $p_v$. The solid angle of the resulting spherical triangle 440 can either be calculated exactly using the Euler-Eriksson formula or approximately by treating it as a planar triangle. The angle $\alpha$ of a spherical cap with the same solid angle can then be obtained. By treating the spherical triangle 440 as a spherical cap that is centered at the spherical triangle's centroid, the calculations can then proceed as follows:

$$d_0 = \frac{p_0 - p_v}{\|p_0 - p_v\|}$$

$$d_1 = \frac{p_1 - p_v}{\|p_1 - p_v\|}$$

$$d_2 = \frac{p_2 - p_v}{\|p_2 - p_v\|}$$

$$d_c = \frac{d_0 + d_1 + d_2}{\|d_0 + d_1 + d_2\|}$$

$$\omega = 2 \arctan \frac{|d_0 \cdot (d_1 \times d_2)|}{1 + d_0 \cdot d_1 + d_1 \cdot d_2 + d_2 \cdot d_0}$$

$$\omega \approx \frac{1}{2} \|(d_2 - d_0) \times (d_1 - d_0)\|$$

$$\cos \alpha = 1 - \frac{\omega}{2\pi} \Rightarrow \sin^2 \alpha = 1 - \left(1 - \frac{\omega}{2\pi}\right)^2$$

$$\cos \beta = d_c^T \cdot n_v$$

$$AO = 1 - \sin^2 \alpha \cos \beta$$

A triangle with vertex positions $p_0$, $p_1$, $p_v$ will occlude $v_i$ if at least one vertex is above $v_i$'s tangent plane. In the following calculations it is assumed (without loss of generality) that $p_0$ is not below $p_1$ with respect to $v_i$.

FIG. 4B shows an embodiment in which both vertices are above $v_i$'s tangent plane. The resulting spherical quadrilateral can be evaluated by evaluating the two spherical triangles $\Delta d_0 d_1 d_2$ and $\Delta d_1 d_2 d_3$:

$$d_0 = \frac{p_0 - p_v}{\|p_0 - p_v\|}$$

$$d_1 = \frac{p_1 - p_v}{\|p_1 - p_v\|}$$

$$d_2 = \frac{p_0 - p_v - ((p_0 - p_v)^T \cdot n_v) \cdot n_v}{\|p_0 - p_v - ((p_0 - p_v)^T \cdot n_v) \cdot n_v\|}$$

$$d_3 = \frac{p_1 - p_v - ((p_1 - p_v)^T \cdot n_v) \cdot n_v}{\|p_1 - p_v - ((p_1 - p_v)^T \cdot n_v) \cdot n_v\|}$$

FIG. 4C shows an embodiment where $p_0$ is above $v_1$'s tangent plane and $p_1$ is below it, resulting in the spherical triangle $\Delta d_0 d_2 d_4$:

$$d_0 = \frac{p_0 - p_v}{\|p_0 - p_v\|}$$

$$d_2 = \frac{p_0 - p_v - ((p_0 - p_v)^T \cdot n_v) \cdot n_v}{\|p_0 - p_v - ((p_0 - p_v)^T \cdot n_v) \cdot n_v\|}$$

$$d_4 = \frac{p_0 - p_v - \left(\frac{(p_0 - p_v)^T \cdot n_v}{(p_1 - p_0)^T \cdot n_v}\right) \cdot (p_1 - p_0)}{\left\|p_0 - p_v - \left(\frac{(p_0 - p_v)^T \cdot n_v}{(p_1 - p_0)^T \cdot n_v}\right) \cdot (p_1 - p_0)\right\|}$$

The calculated AO represents the probability of no occlusion. Therefore, the total AO can be obtained by multiplying the global AO and local AO components.

The complexity of the method can be determined by $O(n_s*n)+O(n_t*n)=O(n)$, where $n_s$ and $n_t$ are the average number of contributing spheres and triangles respectively per vertex and n is the number of unique vertices. The sphere set approximation can enable the global AO calculations to be independent of the resolution of the distant geometry and, as a result, the complexity is $O(n)$ rather than $O(n^2)$. Additional speed-up can be achieved by playing back a "full motion range" animation in a pre-processing stage and figuring out the set of spheres and local triangles that could potentially contribute to the global and local AO of each unique vertex, making it possible to only evaluate a sub-set of all spheres and local triangles at run-time. The global AO changes smoothly over time, meaning it can be updated less frequently than the local AO, thus, providing another speed-up mechanism.

In an embodiment, the model triangles can be used in a pre-processing pass to approximate the model surface by a set of surface elements. Each unique model vertex can have one corresponding surface element, where uniqueness can be determined by vertex position alone (essentially assuming a "smooth" model surface). A surface element can be a two-dimensional (2D) object (e.g., a disc) that is defined by its center position, normal direction and area. In this implementation, the center position and the normal direction of each surface element can be taken directly from the associated vertex data and can be continuously updated at run-time. The surface element area is calculated by summing the areas of all the adjacent triangles of the associated vertex and dividing by three (meaning that each triangle contributes as much area to each of its three vertices).

The real-time calculations can then find the amount of AO at the center, $r_i$, of each surface element. Each surface element's position and normal can define a plane, conceptually the tangent plane of the model surface at that point. Other surface elements that are located (at least partially) above the tangent plane will hence contribute to the ambient occlusion as long as they are back facing with respect to $r_i$.

Figure 5:
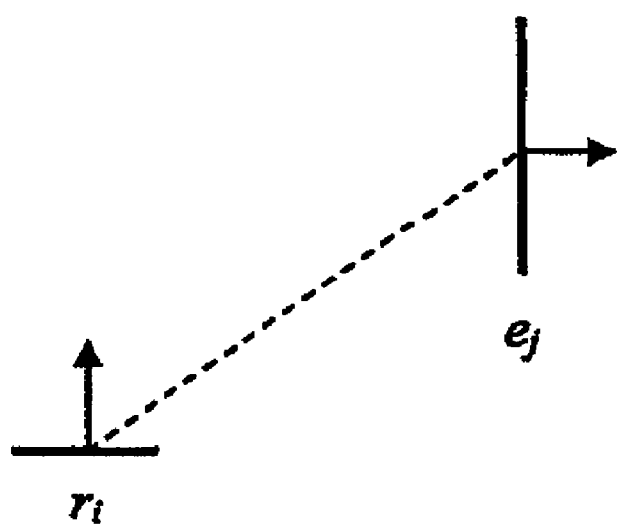
FIG. 5 illustrates a method that can be used for determining the AO experienced at a surface element.

For illustrative purposes, FIG. 5 provides an example method that can be used for determining the AO at $r_i$. For each surface element $r_i$, a tangent plane using $r_i$'s position, $p_i$, and normal, $n_i$ can be defined. For each other, back-facing, surface element $e_j$ the AO contribution can be calculated and added.

There are many techniques available for calculating the ambient occlusion contribution of a surface element. According to M. Bunnell, *Dynamic Ambient Occlusion and Indirect Lighting*, GPU Gems 2, NVIDIA Corp. (2005), repeating the above calculations multiple times while feeding back the approximate ambient occlusion values calculated thus far can improve the accuracy of the solution. In the implementation provided herein, the result of the previous frame's calculations can be re-used to increase accuracy, which can speed up processing.

While the complexity of the basic method is $O(n^2)$, where n is the number of surface elements, the performance can be improved to $O(n \log n)$ by hierarchically merging distant surface elements to form larger "virtual" surface elements. Even though the needed merging data can be created in a pre-processing stage it still introduces additional complexity to the run-time algorithm. Instead of implementing this, nearby surface elements can be grouped and each group can be enclosed by a bounding sphere. This allows quick discard of entire groups of surface elements in the calculations if the associated bounding spheres were found to not contribute to the ambient occlusion, thereby providing additional, much needed, processing speed-up.

Figure 6:
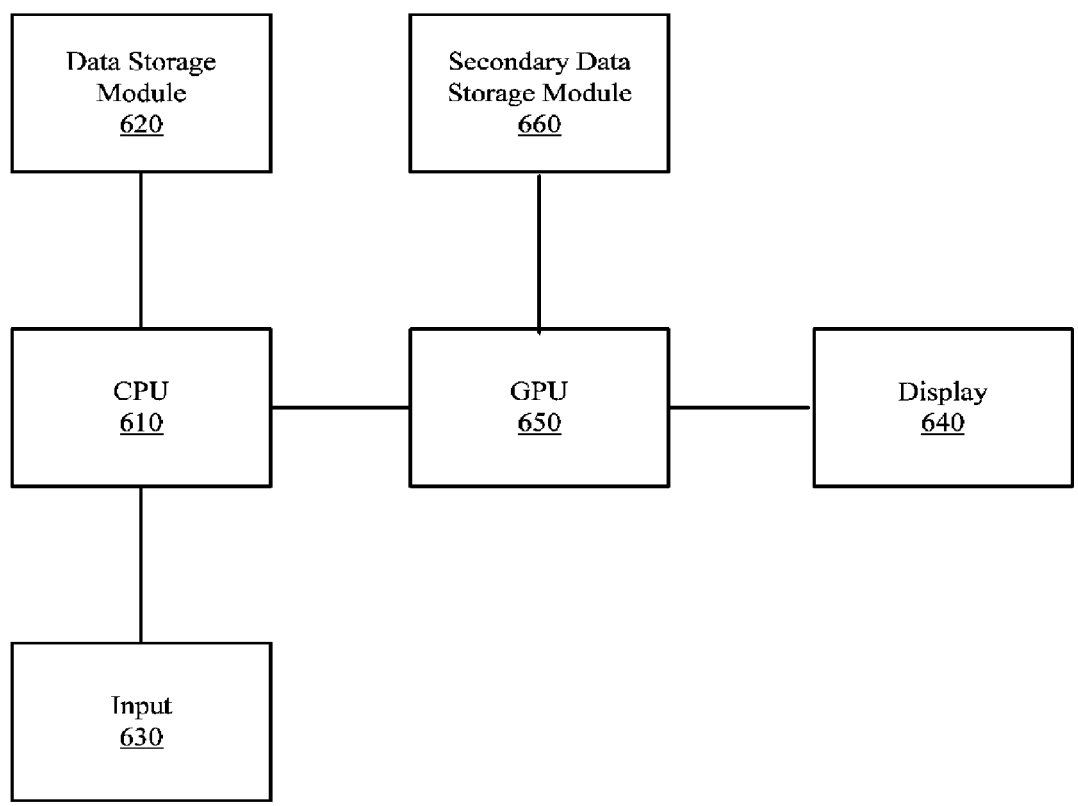
FIG. 6 shows a basic system that can be used to implement the method described in FIG. 1 and/or other embodiments.

FIG. 6 shows a basic system that can be used to implement the various embodiments described in FIG. 1 and/or other embodiments. The system includes a central processing unit (CPU) 610 connected to a data storage module 620. The data storage module 620 may be a combination of hard drives, RAM, ROM, or any other type of machine-readable storage device known in the art, and may be configured to contain instructions operable to cause the CPU 610 to carry out the method. The CPU 610 may be any sort of data processing element available such as those commonly found in video game consoles or personal computers. In an embodiment, the CPU 610 further is configured to receive signals from an input device 630 such as a keyboard, mouse, remote control, video game controller, or any sort of input device known in the art. The input device 630 may be used by a user of the system to cause the CPU 610 to generate images in real time. The generated images may be output to a display 640 such as a computer monitor or television through a graphics processing unit (GPU) 650 such as a video card. In an alternative embodiment, the method may be carried out either completely or partially within the GPU 650. A secondary data storage module 660 may be accessible to the GPU 650 and may store some or all of the instructions operable to cause the GPU 650 to carry out the method.

The foregoing description of embodiments is provided to enable a person skilled in the art to make and use the present invention. Various modifications to these embodiments will be readily apparent to those skilled in the art, and the generic principles and specific examples defined herein may be applied to other embodiments without the use of inventive faculty. For example, some or all of the features of the different embodiments discussed above may be deleted from the embodiment and/or may be combined with features of alternate embodiments. Therefore, the present invention is not intended to be limited to the embodiments described herein but is to be accorded the widest scope defined only by the claims below and equivalents thereof.

What is claimed is:

1. A method of determining the total ambient occlusion (AO) at a vertex of an object within a frame comprising the steps of:
   receiving an indicator to produce a computer-generated digital image, the computer-generated digital image to include a first object;
   determining a location of a vertex of the first object using a computer-generated function;
   determining a global ambient occlusion AO at the vertex of the first object using a function of a geometry of a set of spheres in a sphere-based model;
   determining a local ambient occlusion AO at the vertex of the first object using a function of a geometry of a set of triangles in a triangle-based model;
   determining a total ambient occlusion AO at the vertex of the first object as a function of the local AO and global AO; and,
   producing the computer-generated image, the shading at the vertex of the first object to be dependent on the total AO.

2. A computer program product tangibly embodied in a non-transitory machine-readable storage device, the product comprising instructions operable to cause a data processing apparatus to:
   receive a signal to produce a computer-generated image, the computer-generated image to include a first object;
   determine a location of a vertex of the first object;
   determine a global ambient occlusion AO at the vertex of the first object using a first technique;
   determine a local ambient occlusion AO at the vertex of the first object using a second technique;
   determine a total ambient occlusion AO at the vertex of the first object as a function of the local AO and the global AO; and,
   produce the computer-generated image, the shading at the vertex of the first object to be dependent on the total AO.

3. The computer program product of claim 2, wherein the computer-generated image includes at least a second object formed on at least one of a triangle-based model including a plurality of triangles and and a sphere-based approximation model including a plurality of spheres.

4. The computer program product of claim 2, wherein the local AO is determined as a function of the geometry of a set of triangles in the triangle-based model.

5. The computer program product of claim 2, wherein the global AO is determined as a function of the geometry of a set of spheres in the sphere-based model.

6. The computer program product of claim 2 comprising further instructions operable to cause the data processing apparatus to:
   determine if a second vertex is a redundant vertex; and,
   upon determining that a second vertex is a redundant vertex, then not determining a total AO for the second vertex.

7. The computer program product of claim 2 comprising further instructions operable to cause the data processing apparatus to:
   determine a set of spheres of the plurality of spheres that do not contribute to the AO at the vertex of the first object.

8. The computer program product of claim 2 comprising further instructions operable to cause the data processing apparatus to:
   determine a set of triangles of the plurality of triangles that do not contribute to the AO at the vertex of the first object.

9. The computer program product of claim 2, wherein the data processing apparatus is a video game console.

10. The computer program product of claim 2, wherein the determination of the total AO is generated for the respective vertices of a plurality of objects so as to generate a high quality computer-generated image.

11. The computer program product of claim 2, further comprising generating an updated total ambient occlusion AO in response to detection of an event.

12. The computer program product of claim 11, wherein an event is a geographical movement of any object relative to any other object in the computer-generated image.

13. The computer program product of claim 2, wherein the first and second techniques include an approximation using at least one geometric primitive which is modeled on a mesh, wherein the mesh is created from a series of interconnected geometric primitives.

14. The computer program product of claim 13, wherein the at least one geometric primitive and the interconnected geometric primitives include at least one of: a triangle and a sphere.

15. A system of determining the total ambient occlusion (AO) at a vertex of an object within a frame comprising:
   an indicator producing a computer-generated digital image, the computer-generated digital image having a first object;
   a location of a vertex of the first object, the location of the vertex determined using a computer-generated function;
   a computer-generated image generated in real-time,
   wherein a global ambient occlusion AO at the vertex of the first object is determined using the location of the vertex and a function of a geometry of a set of geometric primitives, a local ambient occlusion AO at the vertex of the first object is determined using the location of the vertex and a function of a geometry of a set geometric primitives, and a total ambient occlusion AO at the vertex of the first object is determined as one of: the local AO, the global AO, and a function of the local AO and global AO, wherein the shading at the vertex of the first object of the computer-generated image is determined by the total AO.

16. The system of claim 15, wherein each of the first and second sets of geometric primitives include at least one of: a set of spheres in a sphere-based model, a set of triangles in a triangle-based model, and a series of interconnected triangles.

17. The system of claim 15, wherein the determination of the total AO is generated for the respective vertices of a plurality of objects so as to generate a high quality computer-generated image.

18. The system of claim 15, further comprising generating an updated total ambient occlusion AO in response to detection of an event.

19. The system of claim 18, wherein an event is a geographical movement of any object relative to any other object in the computer-generated image.

20. The system of claim 15, wherein the computer-generated image is a new frame of a computer file.

* * * * *